United States Patent [19]

Zachariadis

[11] Patent Number: 4,581,724

[45] Date of Patent: Apr. 8, 1986

[54] METHOD FOR DETERMINING SOURCE AND RECEIVER STATICS IN MARINE SEISMIC EXPLORATION

[75] Inventor: Robert G. Zachariadis, Dallas, Tex.

[73] Assignee: Mobil Oil Corporation, New York, N.Y.

[21] Appl. No.: 560,660

[22] Filed: Dec. 12, 1983

[51] Int. Cl.⁴ .......................... G01V 1/36; G01V 1/38
[52] U.S. Cl. ...................................... 367/21; 367/15; 367/36; 367/54
[58] Field of Search ........................ 367/15, 21, 36, 50, 367/54; 364/421

[56] References Cited

U.S. PATENT DOCUMENTS

| | | | |
|---|---|---|---|
| 3,943,484 | 3/1976 | Balderson | 367/21 |
| 4,415,997 | 11/1983 | Wilson | 367/15 |
| 4,516,227 | 5/1985 | Wener et al. | 367/15 |

Primary Examiner—Thomas H. Tarcza
Assistant Examiner—Daniel Thomas Pihulic
Attorney, Agent, or Firm—A. J. McKillop; Michael G. Gilman; George W. Hager, Jr.

[57] ABSTRACT

A method of determining source and receiver statics in a marine exploration area overlying a near surface low velocity layer employing a marine vessel for towing a seismic energy source and a marine detector cable, and an on-bottom seismic energy source and seismic detector located at an offset from the marine seismic line of exploration. The towed seismic energy source generates a seismic reflection signal for detection by the towed marine detector cable and a seismic refraction signal to be detected by the on-bottom seismic detector. The on-bottom seismic energy source generates a seismic refraction signal for detection by the towed marine detector cable.

7 Claims, 6 Drawing Figures

METHOD FOR DETERMINING SOURCE AND RECEIVER STATICS IN MARINE SEISMIC EXPLORATION

BACKGROUND OF THE INVENTION

This invention relates to marine seismic exploration and more particularly to a method for determining source and receiver statics.

A major problem in seismic exploration has been the estimation of time delays under source and receiver positions due to weathering, elevation, and shallow velocity changes. Particularly in some marine exploration areas severe time delays can be caused by the existence of a variety of subaqueous features and other sea floor irregularities. Such anomalies generally lie immediately below the water bottom and contain sediments having abnormally low velocities relative to normal sediments at shallow depths. These time delays are often lumped together and simply called "static errors", and the corrections necessary to correct seismic traces for this error are called "static corrections" or "statics".

The widespread use of multiple coverage seismic profiling and the stacking of the multifold common depth point data as described in "Common Reflection Point Horizontal Data Stacking Techniques" by W. Harry Mayne, "Geophysics", Vol. XXVII, No. 6, Part 2 (December, 1962), pp. 927–938, requires the elimination of these static errors. Several methods are known for determining these static errors, one of which is described in "The Application and Limitations of Automatic Residual Static Correction Techniques" by B. M. Irving and J. K. Worley, presented at the 39th Annual International Meeting of the Society of Explortion Geophysicists in Calgary, Alberta, Canada. Such method, as well as others, provides a means of resolving the static estimates into source statics and receiver statics. It is these two components, source statics and receiver statics, which are utilized to correct the seismic data prior to common depth point stacking.

SUMMARY OF THE INVENTION

The present invention is directed to a method for determining source and receiver statics at a marine exploration site having erratic low velocity layering below the water bottom.

A seismic energy source and a seismic energy detector are deployed on the water bottom at a point offset from a marine exploration line. A marine vessel tows a seismic energy source and a seismic marine cable employing a plurality of hydrophones along the line of exploration. Seismic energy is generated from the towed seismic energy source to produce a seismic reflection signal that is detected by the hydrophones on the seismic marine cable and a first seismic refraction signal that is detected by the on-bottom seismic detector. This first seismic refraction signal includes a source static attributable to time delay in the near surface earth formation directly below the towed seismic energy source. Thereafter seismic energy is generated by the on-bottom seismic energy source to produce a second seismic refraction signal that is detected by the hydrophones on the seismic marine cable. This second seismic refraction signal includes receiver statics attributable to time delay in the near surface earth formation directly below each of the receiving hydrophones.

The first seismic refraction signal also includes a receiver static due to layering below the on-bottom seismic detector. However by keeping the on-bottom detector in a fixed position its receiver static remains essentially constant. Similarly the on-bottom source has a source static that remains essentially constant and hence does not interfere with the derivation of static corrections for the towed source and receivers.

The alternating firings of the towed and on-bottom seismic energy sources is continued as the marine vessel traverses the marine exploration line to produce a plurality of seismic reflection and first seismic refraction signals along with a plurality of intervening second seismic refraction signals.

In a further aspect of the invention, an interpolation is made between the receiver statics of successive pairs of the second seismic refraction signals to produce estimated receiver statics corresponding to the time delays directly below the hydrophones on the marine seismic cable when such hydrophones detect the seismic reflection signals. These estimated receiver statics are combined with the source statics for each seismic energy generation from the towed seismic source to produce a total static correction for each seismic reflection signal.

DESCRIPTION OF THE PREFERRED EMBODIMENT

Figure 1:
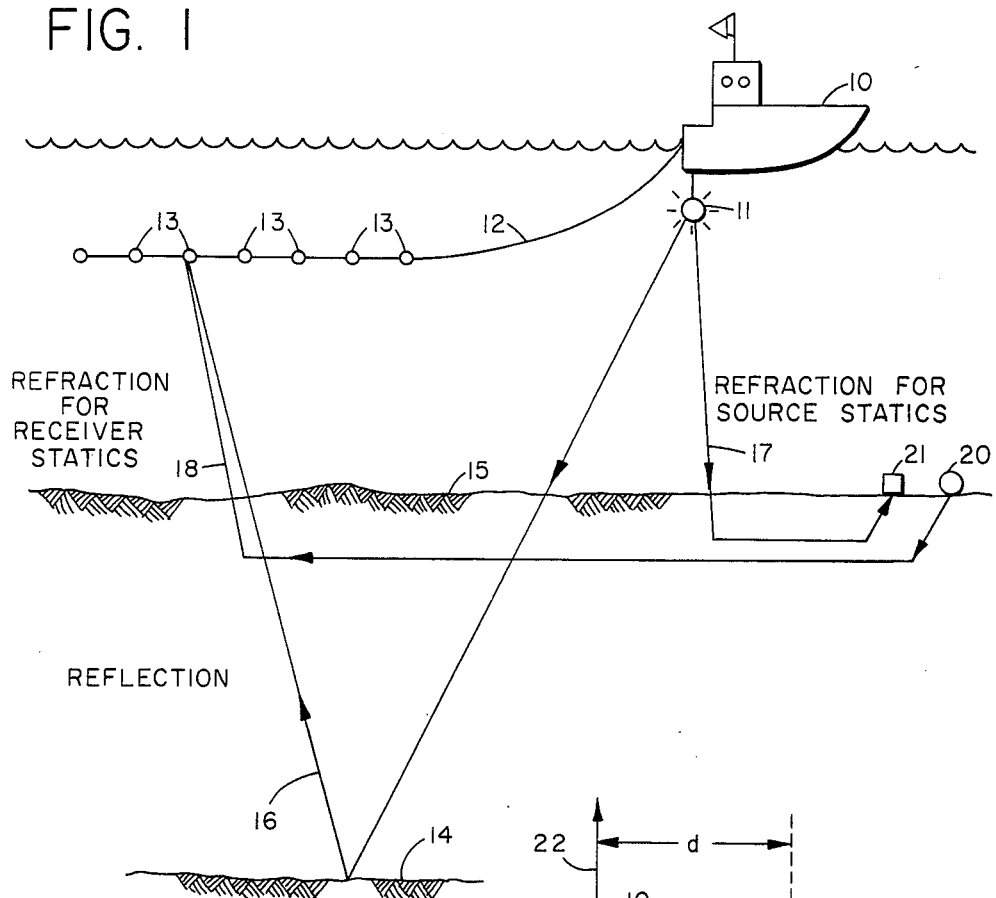
FIGS. 1 and 2 are pictorial representations of the method of the present invention for determining source and receiver statics along a marine seismic exploration line.

Referring to FIG. 1, the seismic marine vessel 10 traverses a marine exploration line. The vessel 10 tows a seismic energy source 11 and a seismic detector cable 12 employing a plurality of hydrophones 13 spaced along the cable. Seismic energy is generated in the water by the source 11 and reflections of such energy from subsurface formations, such as illustrated at 14 below the water bottom 15, are detected by the plurality of hydrophones 13 on the seismic cable 12. These reflection signals received by the hydrophones 13 are transferred to the marine vessel 10 through the cable wiring for recording and processing. If the hydrophones overlie an anomalous layer of low velocity sediments, an undesirable receiver statics effect will be imposed on the seismic reflection signals. Also, if the seismic energy source is energized over such a low velocity sediment, undesirable source statics will be recorded in the reflection signals.

Figure 2:
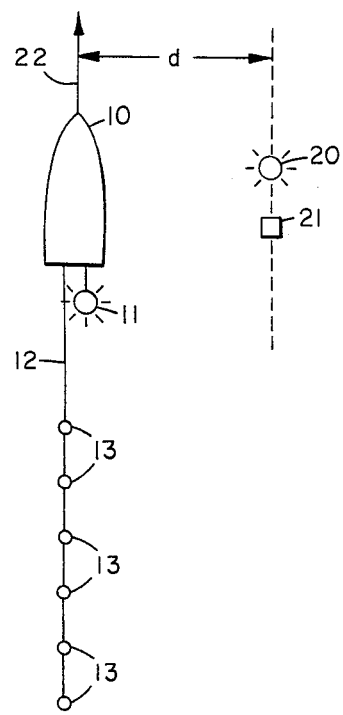

Referring to both FIGS. 1 and 2, a seismic energy source 20 and a seismic detector, or hydrophone, 21 are deployed on the water bottom 15 at a position horizontally offset a distance d from a line of exploration 22 being traversed by the vessel 10. Each seismic energy generation from the source 11, in addition to being detected at the hydrophones 13 of detector cable 12 as a seismic reflection signal 16, is also detected at the on-bottom hydrophone 21 as a seismic refraction signal 17. Each seismic energy generation from the on-bottom source 20 is detected at the hydrophones 13 of detector cable 12 as a seismic refraction signal 18. The offset distance should be large enough to ensure that the refraction signal is the first signal received, and small enough to ensure that the same signal is large enough to be readily detectable. These maximum and minimum distances will vary from area to area depending upon the local velocity structure in the subsurface.

In accordance with the present invention, the firing of sources 11 and 20 are alternated and the resulting reflection and second refraction signals received alternately by the plurality of hydrophones 13 are utilized to identify source and receiver statics for the particular marine exploration line 22. Referring more particularly to FIGS. 3A-3D there are illustrated a plurality of four alternating seismic firings: a first firing of the towed source 11, a first firing of on-bottom source 20, a second firing of the towed source 11, and a second firing of the on-bottom source 20 respectively.

Figure 3A:
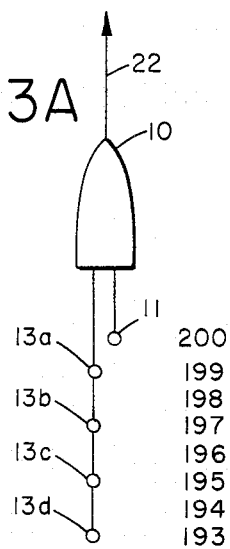
FIGS. 3A-3D are pictorial representations of a sequence of seismic energy generations for alternating reflection and refraction operations along the marine seismic exploration line of FIG. 2.
Figure 3B:
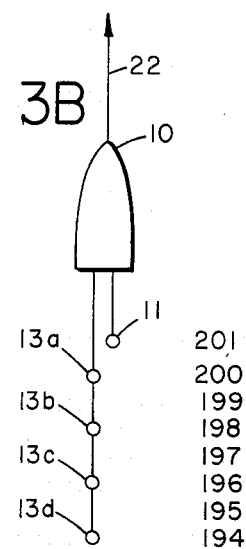
Figure 3C:
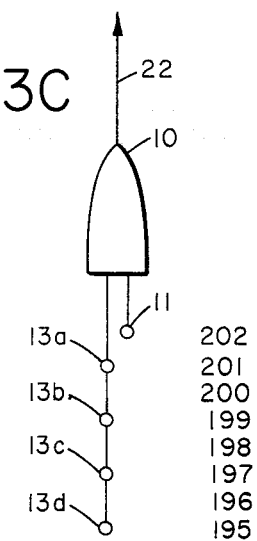
Figure 3D:
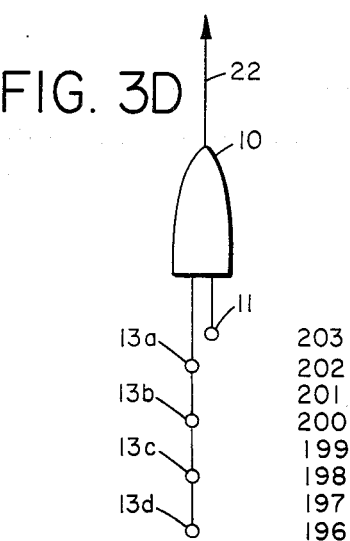

In FIG. 3A, the towed source 11 is fired at shot point location 200 and reflection signals are received at the seismic detector cable 12 by hydrophones 13a-13d, for example, at locations 193, 195, 197 and 199. Also a first refraction signal is received by the on-bottom hydrohone 21. As the vessel 10 moves along the line of exploration as seen in FIG. 3B the next seismic energy generation is from the firing of on-bottom source 20 to produce a second refraction signal which is received at the seismic detector cable 12 by the same hydrophones 13a-13d now positioned at locations 194, 196, 198 and 200. As the vessel 10 continues to move along the line of exploration the next succeeding seismic energy generation is from the firing of towed source 11 at locations 202 as shown in FIG. 3c and reflection signals are received by hydrophones 13a-13d now positioned at locations 195, 197, 199 and 201, while a first refraction signal is again received by on-bottom hydrophone 21. FIG. 3D shows the next succeeding seismic energy generation from the firing of on-bottom source 20 with hydrophones 13a-13d positioned at locations 196, 198, 200 and 202 for receiving the resulting second seismic refraction signal.

In accordance with the operations of FIGS. 3A and 3C low velocity layer statics for source locations 200 and 202 respectively are determined by comparing the reflection signals recorded by hydrophones 13a-13d with the first refraction signals recorded by the on-bottom hydrophone 21.

When the on-bottom source 20 is fired, the hydrophones 13a-13d have advanced along the line of exploration from their locations during the preceding firing of the towed source 11. For example, with the firing of source 11 from locations 200 and 202, hydrophone 13d is positioned at locations 193 and 195 respectively for receiving reflection signals. With the intervening firings of the on-bottom source 20, hydrophone 13d is positioned at location 194 and then at location 196 for the receiving of the second refraction signals. By interpolation the low velocity layer statics for receiver locations 193 and 195 can be estimated by averaging the receiver statics components determined for the preceding and following second refraction signals. For example, the receiver statics for location 193 is estimated by averaging the measured receiver statics for locations 192 and 194. Likewise the receiver statics for location 195 is estimated by averaging the measured receiver statics for locations 194 and 196. These measured receiver statics are determined by estimating a velocity-depth function and calculating a travel time function. The velocity function may be measured by shooting conventional refraction lines in adjacent areas which are essentially static free or by analysis of the observed data gathered in the actual survey. Such analysis includes the determination of a best fit function for travel time versus offset and the determination of static shifts until the best fit value for a pariticular offset is obtained. Such time shifts may be either positive or negative. When such a travel time function has been obtained, source statics can be derived by calculating the appropriate travel time that would be expected for a source to on-bottom receiver distance corresponding to that for a static free seismic refraction signal and subtracting it from that travel time actually observed. The same process is carried out for each on-bottom source shot and towed receiver position. In this manner total source and receiver statics are identified for each seismic reflection signal. Corrections to the recorded seismic reflection signals can now be carried out by removing the distortions caused by such source and receiver statics introduced by the low velocity layers.

In the above described preferred embodiment, the seismic exploration system may be of the type described in U.S. Pat. No. 4,146,870 to W. H. Ruehle wherein a seismic energy source and a seismic detector cable are towed through the water along a line of exploration. A suitable seismic energy source for producing repetitive pulses of seismic energy is the pneumatic acoustic source described in U.S. Pat. No. 3,506,085 to George B. Loper. An on-bottom seismic receiver system that is particularly suitable for use for refraction measurements is disclosed in U.S. Patent application Ser. No. 163,757 filed June 27, 1980 now U.S. Pat. No. 4422164 to Bowden et al.

What is claimed is:
1. A method for seismic exploration at a marine exploration site, comprising the steps of:
  a. fixing a seismic energy source and a seismic energy detector on the water bottom at a point offset from a marine exploration line,
  b. traversing said marine exploration line with a marine vessel towing a seismic energy source and a seismic marine cable employing a plurality of spaced-apart hydrophones,
  c. generating seismic energy from said towed seismic energy source to produce a seismic reflection signal that is detected by said plurality of hydrophones on said seismic marine cable and a first seismic refraction signal that is detected by said fixed seismic energy detector, said first seismic refraction signal including a source statics attributable to time delay in the near surface earth formation directly below said towed seismic energy source,
  d. generating seismic energy from said fixed seismic energy source to produce a second seismic refraction signal that is detected by each of said plurality of hydrophones on said seismic marine cable, said second seismic refraction signal including a receiver statics attributable to time delay in the near surface earth formation directly below each of said pluarlity of hydrophones, and,
  e. alternately repeating steps c and d as said marine vessel traverses said marine exploration line to produce a plurality of seismic reflection signals and first seismic refraction signals along with a plurality of intervening second seismic refraction signals.

2. The method of claim 1 further comprising the steps of:
  a. interpolating between the receiver statics of successive pairs of said second seismic refraction signals to produce estimated receiver statics corresponding to the time delays directly below the plurality of hydrophones when said hydrophones detect the seismic reflection signals, and b. combining said estimated receiver statics with said source statics for each seismic energy generation from said towed seismic energy source to produce a total static correction for each of said plurality of seismic reflection signals.

3. The method of claim 2 wherein the step of interpolating between receiver statics of successive pairs of said second seismic refraction signals includes the interpolation between said sucessive pairs of second seismic refraction signals.

4. The method of claim 2 wherein the receiver statics of said second seismic refraction signals are determined by comparing said second seismic refraction signals to static free seismic refraction signals obtained from an adjacent non-low velocity layer earth area.

5. The method of claim 2 wherein the receiver statics of said second seismic refraction signals are determined by determining a best-fit function for travel time versus offset and determining static shifts until the best-fit value is obtained for the particular offset.

6. The method of claim 2 wherein the source statics of said seismic reflection signals are determined by comparing said first seismic refraction signals to static free seismic refraction signals.

7. The method of claim 6 wherein said comparison is carried out by determining the travel time that would be expected for a source-to-on-bottom receiver distance corresponding to that for a static free seismic refraction signal and subtracting it from the travel time actually observed.

* * * * *